(12) United States Patent
Lemay et al.

(10) Patent No.: US 10,673,863 B2
(45) Date of Patent: Jun. 2, 2020

(54) MANAGING INTER-OBJECT OPERATIONS IN A DOMAIN ROLE-BASED ACCESS CONTROL (RBAC) SYSTEM

(71) Applicant: International Business Machines Corporation, Armonk, NY (US)

(72) Inventors: Monica J. Lemay, Cedar Park, TX (US); Yogesh G. Patgar, Bangalore (IN); Girish S. Shrigiri, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 15/441,583

(22) Filed: Feb. 24, 2017

(65) Prior Publication Data
US 2018/0248885 A1    Aug. 30, 2018

(51) Int. Cl.
*H04L 29/06*   (2006.01)
*G06F 21/62*   (2013.01)

(52) U.S. Cl.
CPC ........ *H04L 63/105* (2013.01); *G06F 21/6209* (2013.01)

(58) Field of Classification Search
CPC ....... H04L 63/105; H04L 29/06; H04L 63/08; H04L 63/102; H04L 63/10; G06F 21/6218; G06F 21/6209; H04W 12/06
See application file for complete search history.

(56) References Cited

U.S. PATENT DOCUMENTS

| | | | |
|---|---|---|---|
| 6,609,153 B1 * | 8/2003 | Salkewicz | H04L 41/00 370/352 |
| 7,530,112 B2 | 5/2009 | Smith | |
| 7,568,217 B1 | 7/2009 | Prasad et al. | |
| 9,807,608 B2 * | 10/2017 | Cha | H04W 12/06 |
| 2007/0283443 A1 | 12/2007 | McPherson et al. | |
| 2016/0210260 A1 * | 7/2016 | Case | G06F 9/5011 |

OTHER PUBLICATIONS

Dapeng Xiong, Liang Chen, T-RBAC based Multi-domain Access Control Methodin Cloud, Dec. 30, 2016, Network Protocols and Algorithms ISSN 1943-3581 2016, vol. 8, No. 4 (Year: 2016).*
Dapeng Xiong, Liang Chen, T-RBAC based Multi-domain Access Control Methodin Cloud, Dec. 30, 2016, Network Protocols and Algorithms ISSN 1943-3581 2016, vol. 8, No. 4 (Year: 2016) (Year: 2016).*
Gouglidis et al., "Verification of Secure Inter-operation Properties in Multi-domain RBAC Systems," IEEE 7th ntemational Conference on Software Security and Reliability-Companion (SERE-C), Jun. 2013, Gaithersburg, Maryland, 10 pages.

* cited by examiner

*Primary Examiner* — Farid Homayounmehr
*Assistant Examiner* — Sanchit K Sarker
(74) *Attorney, Agent, or Firm* — VanLeeuwen & VanLeeuwen; Bryan S. Bortnick

(57) ABSTRACT

An approach is provided in which an information handling system receives a request from a subject to perform an operation between a first object and a second object. The first object belongs to a first set of domains and the second object belongs to a second set of domains. The information handling system determines whether a set of common domains exist between first set of domains and the second set of domains that meet an inter-domain restriction that is imposed on the subject, which requires that the first set of domains and the second set of domains have at least one domain in common. The information handling system, in turn, performs the operation based on the determination.

13 Claims, 8 Drawing Sheets

MANAGING INTER-OBJECT OPERATIONS IN A DOMAIN ROLE-BASED ACCESS CONTROL (RBAC) SYSTEM

BACKGROUND

Role-based-access-control (RBAC) is a policy-neutral access control mechanism defined around roles and privileges. RBAC can be used to facilitate administration of security in large organizations with hundreds of users and thousands of permissions.

Role-based access control (RBAC) provides the facility to delegate duties and improves the security of a system because of the ease of auditing and tracking of activities on the system, such as by providing a mechanism to split various functions of a super user root into roles that can be delegated to other users on a system. Although RBAC provide delegation of responsibility to another user (referred as an "authorized user"), it does not provide a mechanism to limit the administrative rights of an authorized user to specific resources of the system. For example, a user that has network administrative rights is able manage every network interface on the system.

In an RBAC system, a "subject" is an entity that requests access to an object (e.g., process, user, etc.). An "object" in an RBAC system is an entity that holds information of value, such as files, devices, and network ports. A "domain" in an RBAC system is defined as a category to which an entity belongs. RBAC includes a feature to restrict access to authorized users by attaching domain tags to users and resources in the system. The specific access rules determine access to resources by the users. When a subject belongs to two or more domains, and those domains contain unique objects, RBAC does not restrict a subject to execute an operation between the objects in the two different domains. For example, if a subject S1 belongs to domain D1 and D2 that include objects O1 and O4. respectively, the subject S1 may perform operations between O1 and O4 without restriction.

BRIEF SUMMARY

According to one embodiment of the present disclosure, an approach is provided in which an information handling system receives a request from a subject to perform an operation between a first object and a second object. The first object belongs to a first set of domains and the second object belongs to a second set of domains. The information handling system determines whether a set of common domains exist between first set of domains and the second set of domains that meet an inter-domain restriction that is imposed on the subject, which requires that the first set of domains and the second set of domains have at least one domain in common. The information handling system, in turn, performs the operation based on the determination.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
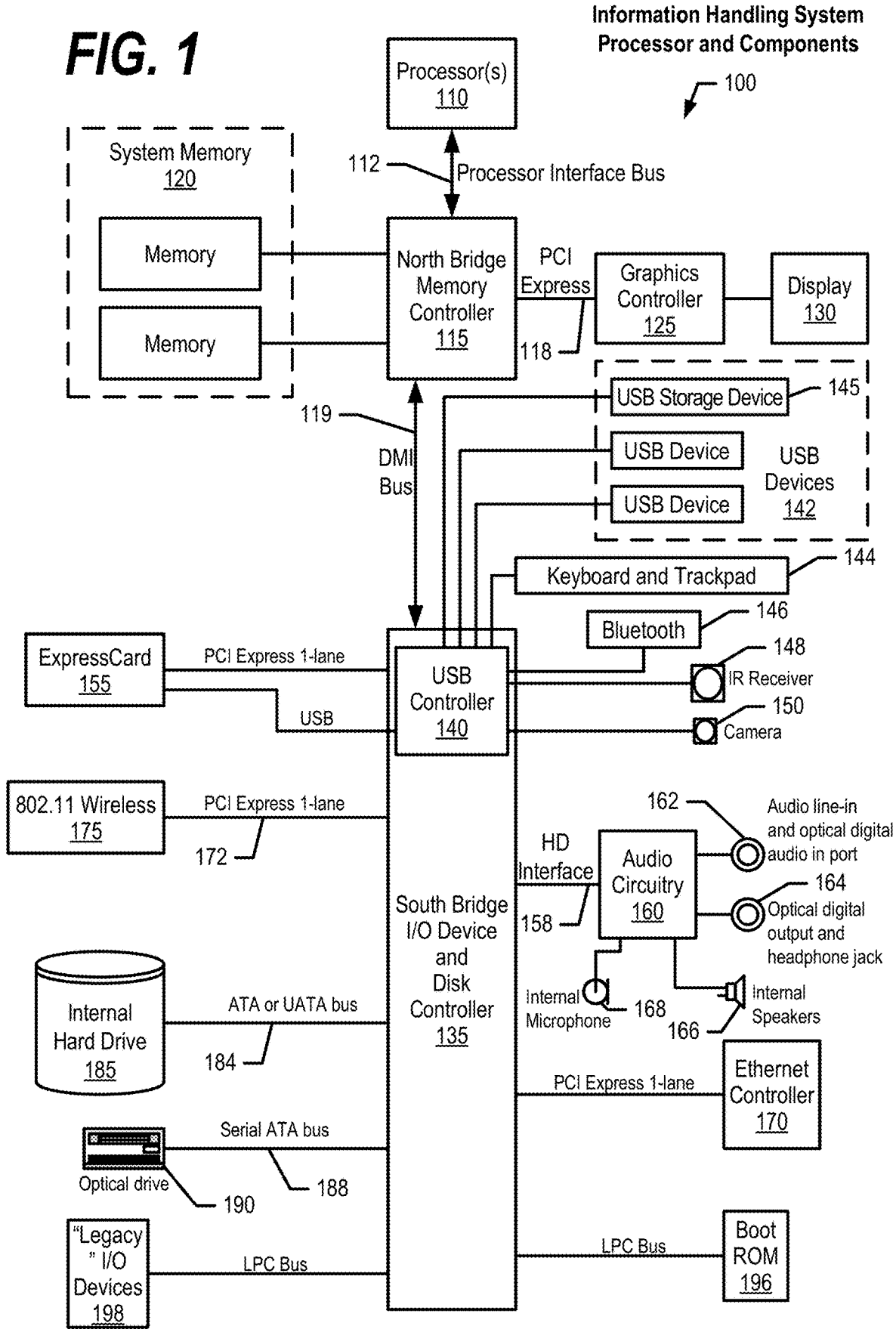
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
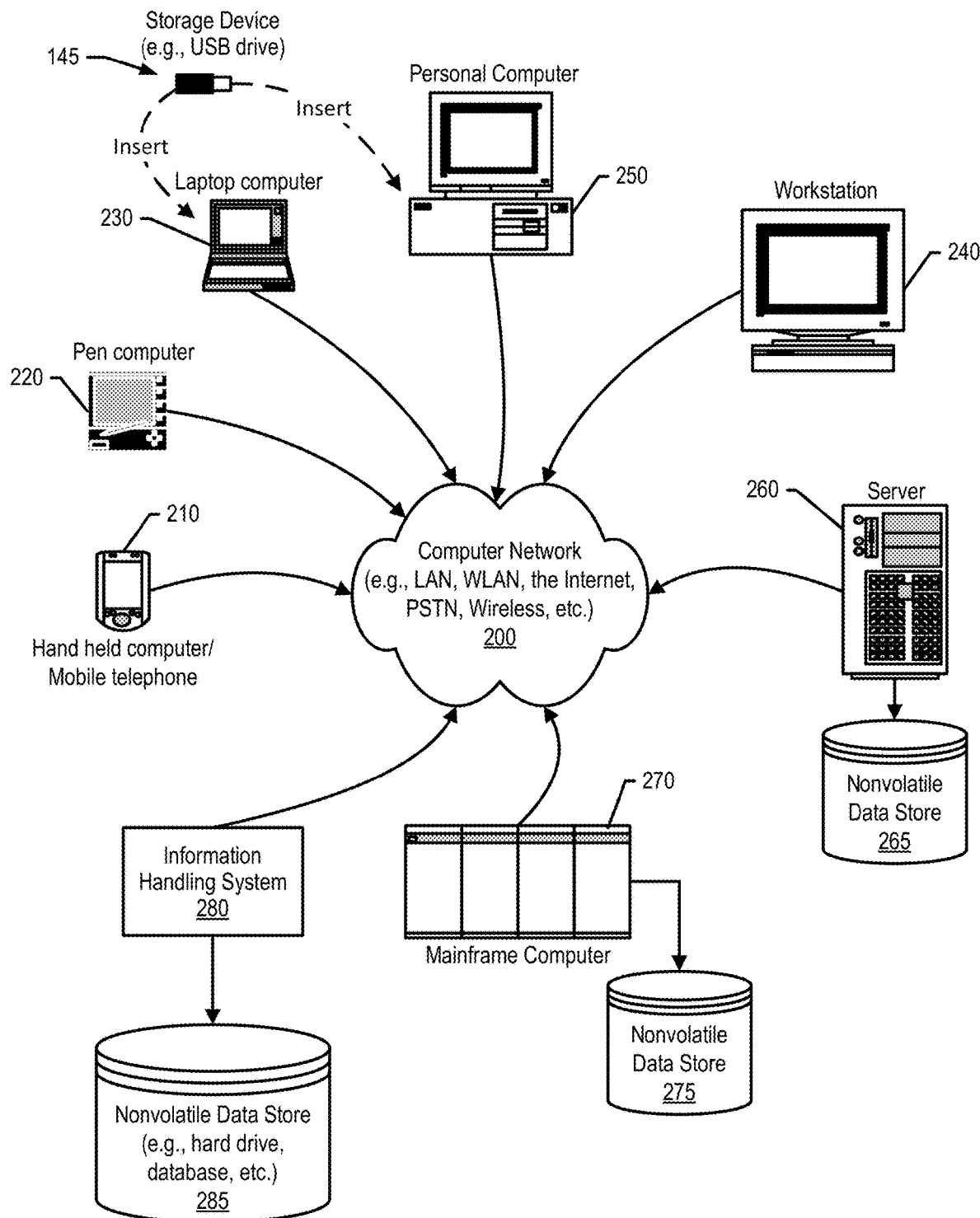
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 8 depict an approach that can be executed on an information handling system. When the information handling system receives a request from a subject that involves two or more objects, the information handling system first verifies that the subject has access to each of the objects. Then, the information handling system analyzes the subject's domain attribute value, referred to herein as a common domain flag attribute value, which is indicates whether restrictions are imposed on the subject to perform operations between the objects based on the objects' domain commonality. In one embodiment, the common domain flag attribute value is NONE, ANY, or ALL. When the common domain attribute value is ANY, the information handling system permits the requested operation if the objects have at least one domain in common. When the common domain attribute value is ALL, the information handling system permits the requested operation if the objects have all of their domains in common. When the common domain attribute value is NONE, the information handling system permits the operation regardless of common domains between the objects.

Figure 3:
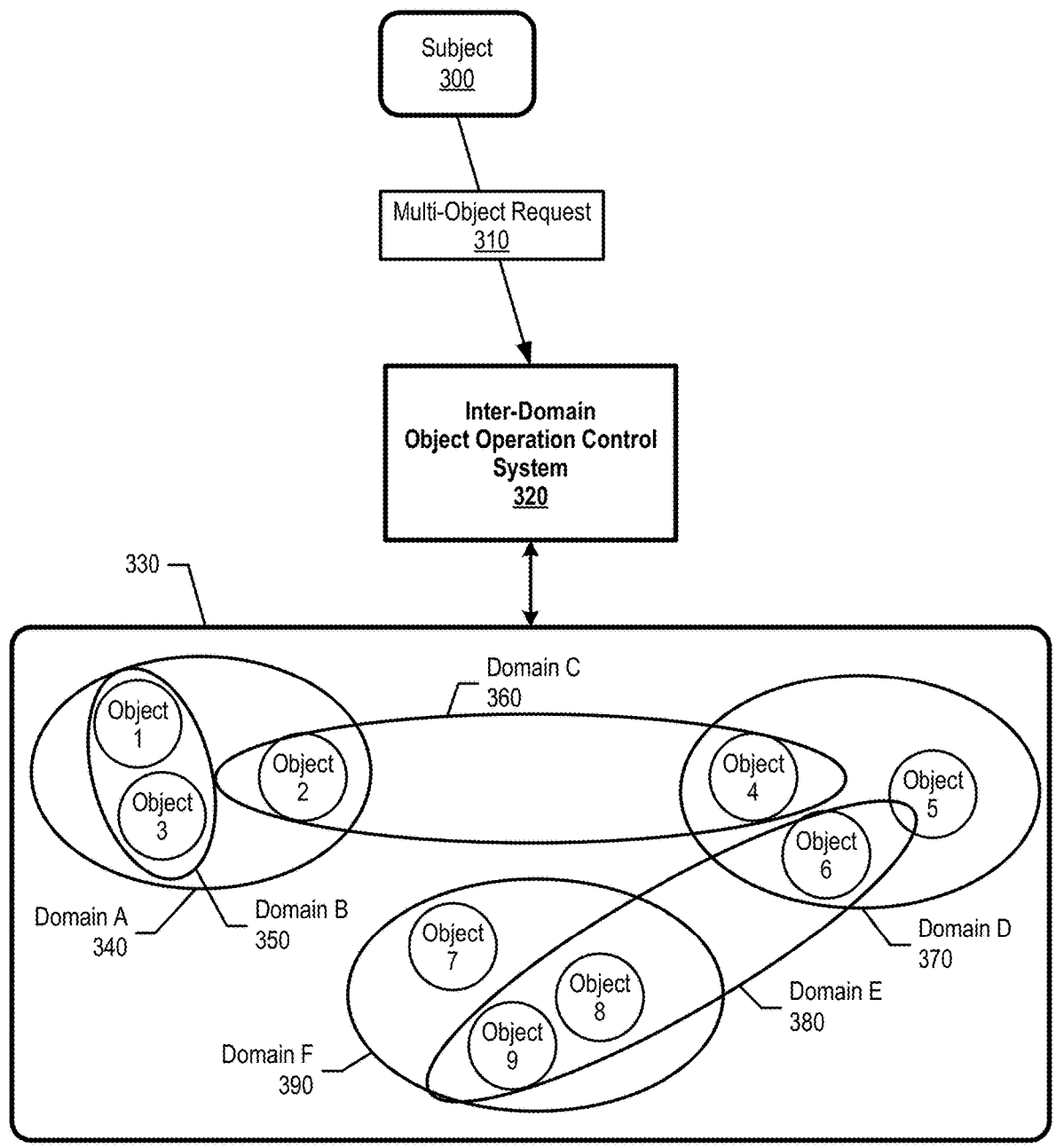
FIG. 3 is an exemplary diagram of an inter-domain object operation control system managing multi-object requests initiated by a subject.

FIG. 3 is an exemplary diagram of an inter-domain object operation control system 320 managing multi-object requests initiated by a subject. Inter-domain object operation control system 320 receives multi-object request 310 from subject 300, which includes a request to perform an operation on multiple objects (two or more) within system 330. System 330 includes object 1, object 2, object 3, object 4, object 5, object 6, object 7, object 8, and object 9. Each of the objects may be a database, a file, a network port, etc. System 330 also shows how the objects are assigned to particular domains 340, 350, 360, 370, 380, and 390.

Inter-domain object operation control system 320 analyzes multi-object request 310 and first determines whether subject 300 is authorized to access the objects referenced in multi-object request 310. If so, inter-domain object operation control system 320 then identifies subject 300's common domain flag attribute value that, in one embodiment, is retrieved from a domain subject database. When the common domain attribute value is "ANY," inter-domain object operation control system 320 identifies a set of common domains between the two objects and permits the requested operation if the objects have at least one domain in common. For example, object 2 and object 4 have a common domain 360 and, therefore, inter-domain object operation control system 320 would permit data transfer between object 2 and object 4. However, subject 300 would not be permitted to perform operations between object 2 and object 7 because the two objects have domain in common.

When the common domain attribute value is "ALL," inter-domain object operation control system 320 permits the requested operation if the objects have all of their domains in common. Referring to the example above, inter-domain object operation control system 320 would not permit subject 300 to perform an operation between object 2 and object 4 because object 2 belongs to domain 340 (object 4 does not) and object 4 belongs to domain 370 (object 2 does not). Inter-domain object operation control system 320 would allow operations to perform between object 1 and object 3 because both objects belong to domain 340 and domain 350 without belonging to a domain that includes only one of the objects. When the common domain attribute value is "NONE," inter-domain object operation control system 320 permits the operation between objects regardless of their domain assignments.

Figure 4:
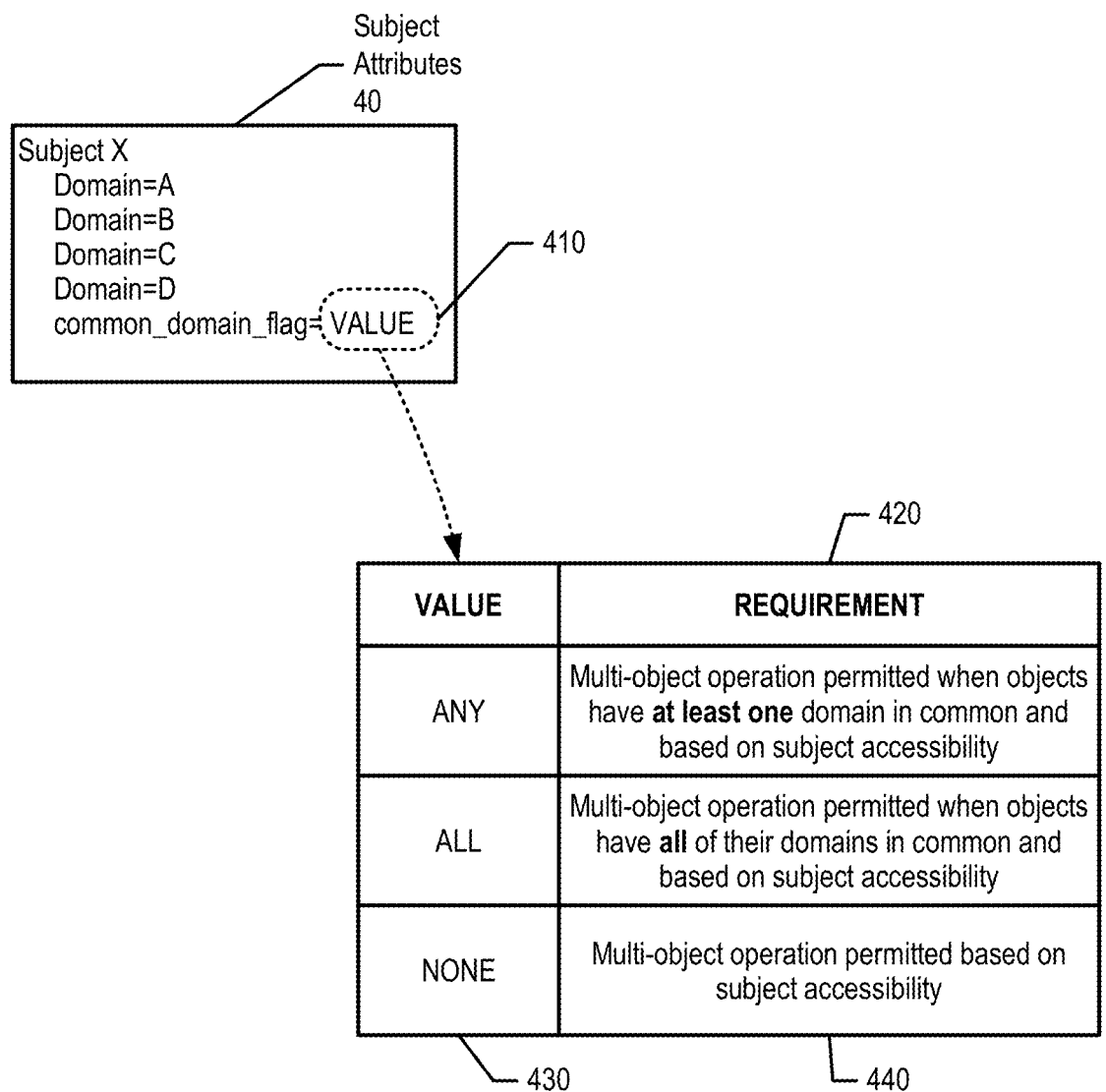
FIG. 4 is an exemplary diagram depicting subject attributes that include a common domain flag attribute.

FIG. 4 is an exemplary diagram depicting subject attributes that include a common domain flag attribute. Inter-domain object operation control system 320 stores subject attributes 400 in, for example, a domain subject database. Subject attributes 400 includes a list of domains to which the subject belongs (e.g., domain A and B), and also includes a common domain flag attribute value 410 that is specific to the subject.

Table 420 shows examples of common domain flag attribute values as discussed herein. Those skilled in the art would understand that more, less, or different values may be used by inter-domain object operation control system 320 than what is shown in table 420. Column 430 includes a list of flag values and column 440 includes a list of their corresponding common domain requirements. When the common domain flag attribute value is ANY, inter-domain object operation control system 320 permits an operation requested by subject X when the objects have at least one domain in common. When the common domain flag attribute value is ALL, the information handling system permits the requested operation if the objects have all of their domains in common. And, when the common domain flag attribute value is NONE, inter-domain object operation control system 320 permits the operation regardless of common domains between the objects.

Figure 5:
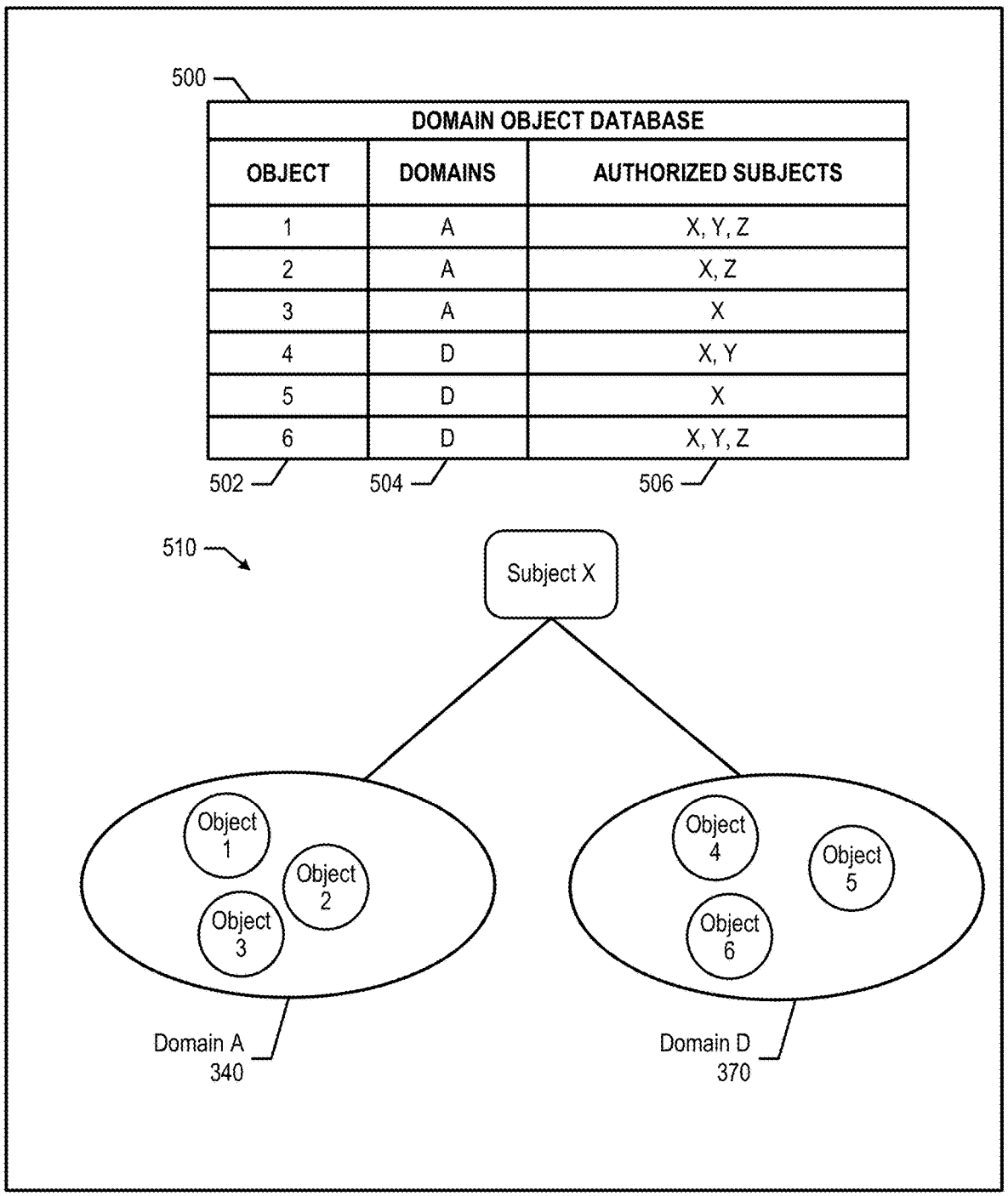
FIG. 5 is an exemplary diagram of a domain object database and corresponding graphical depiction.

FIG. 5 is an exemplary diagram of a domain object database and corresponding graphical depiction. Domain object database 500 is generated, in one embodiment, by a system administrator and lists objects (column 502); the domains to which the objects belong (column 504); and the subjects that are authorized to access the corresponding objects (column 506). From FIG. 4's subject attributes 400, subject X belongs to both domain A 340 and domain B 370. As such, view 510 is a graphical depiction of subject X's domain access and objects belonging to their corresponding domains based on domain object database 500. As can be seen, objects 1, 2, and 3 belong to domain A 340 and objects 4, 5, and 6 belong to domain B 370 (from column 504).

Inter-domain object operation control system 320 allows operations between the objects based on subject X's common domain flag attribute value and domain assignments. For example, if subject X's common domain flag attribute value is ANY or ALL, inter-domain object operation control system 320 would permit operations between objects 1, 2, or 3 (domain A 340), or operations between objects 4, 5, or 6 (domain D 370). However, inter-domain object operation control system 320 would not permit operations between an object in domain A 340 and an object in domain D 370.

Figure 6:
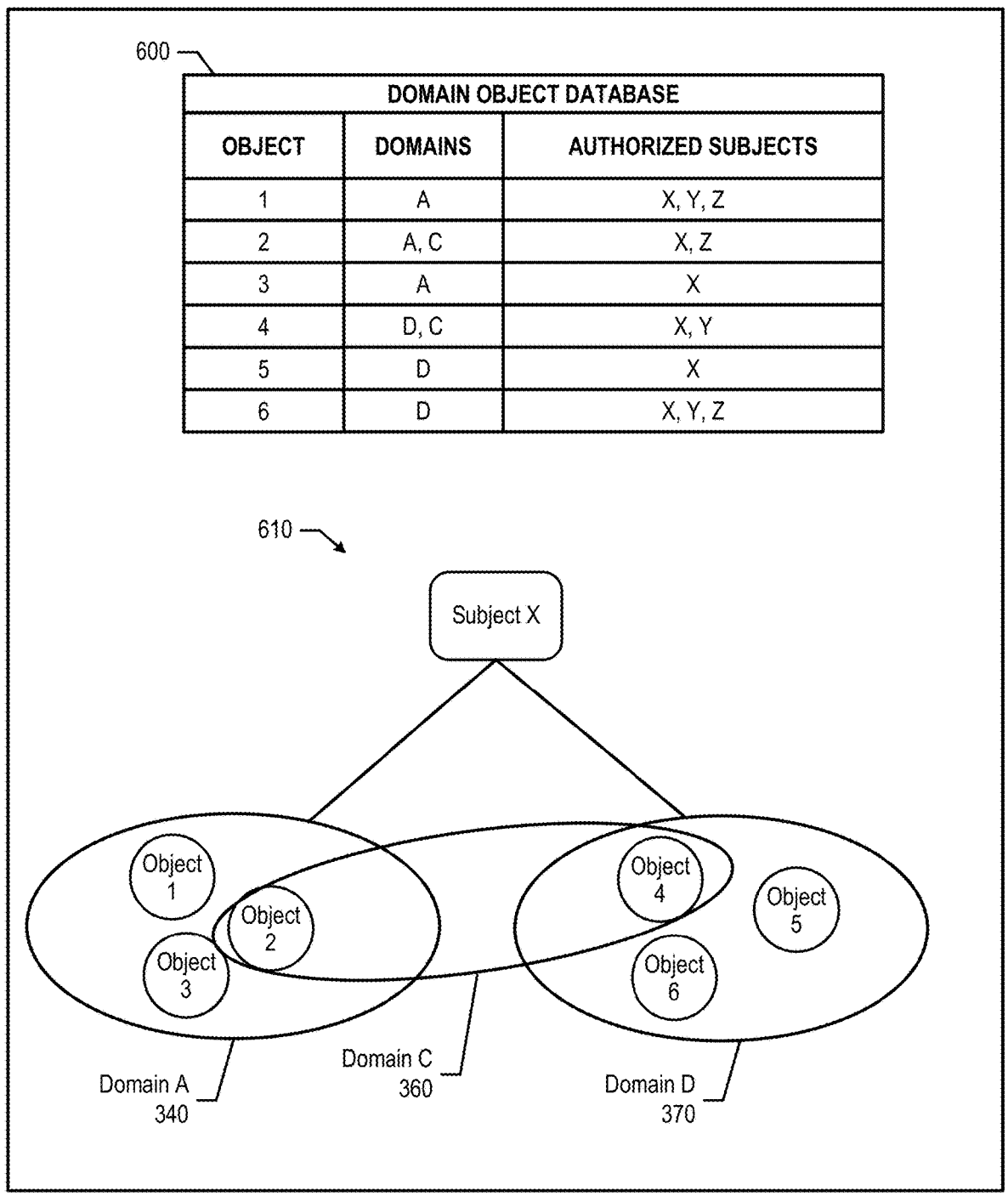
FIG. 6 is another exemplary diagram of a domain object database and corresponding graphical depiction.

FIG. 6 is another exemplary diagram of a domain object database and corresponding graphical depiction. FIG. 6 is similar to FIG. 5 with the addition of domain C 360. Domain object database 600 shows that objects 2 and 4 belong to domain C. Therefore, compared against FIG. 5, subject X may now perform operations between object 2 and 4 when subject X's common domain flag is ANY.

Figure 7:
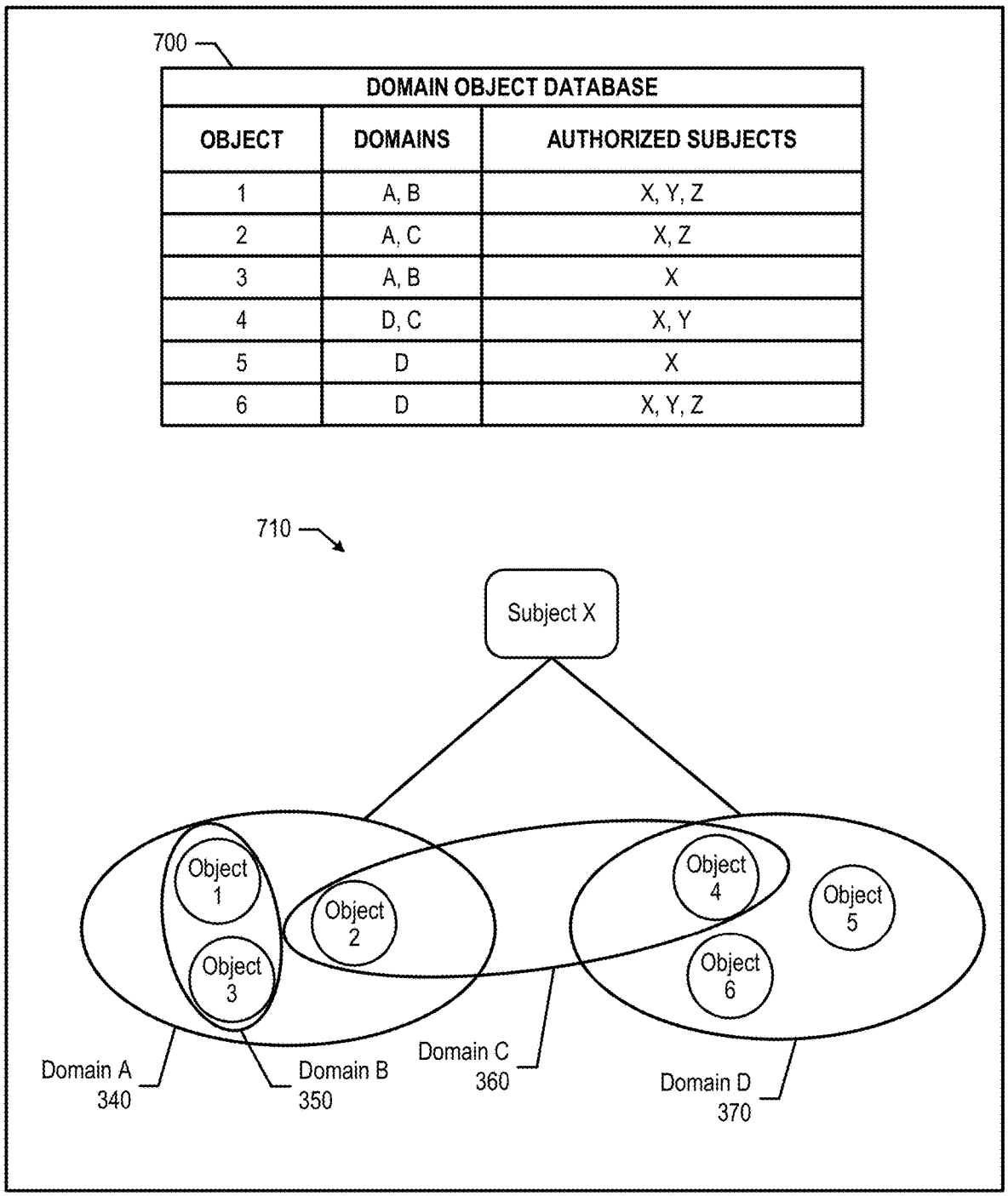
FIG. 7 is another exemplary diagram of a domain object database and corresponding graphical depiction.

FIG. 7 is another exemplary diagram of a domain object database and corresponding graphical depiction. FIG. 7 is similar to FIG. 6 with the addition of domain B 350. Domain object database 700 shows that objects 1 and 3 belong to domain B 350. When subject X has an ALL common domain flag attribute value, inter-domain object operation control system 320 permits operations between object 1 and 3 because they both belong to domains A 340 and B 350 and neither object 1 nor object 3 belong to a separate domain.

Figure 8:
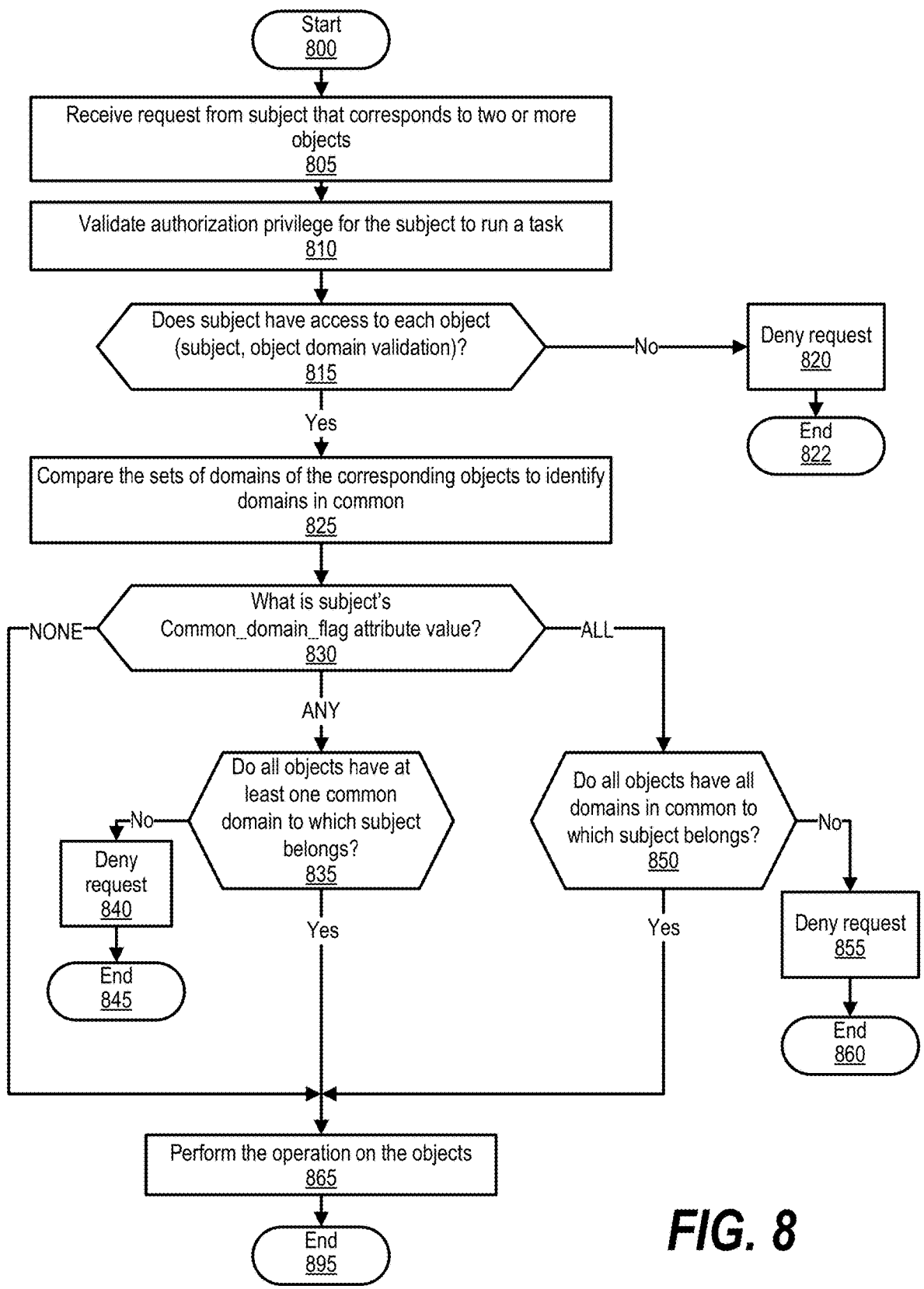
FIG. 8 is an exemplary flowchart depicting steps taken to process a multi-object request that is initiated by a subject.

FIG. 8 is an exemplary flowchart depicting steps taken to process a multi-object request that is initiated by a subject. FIG. 8 processing commences at 800 whereupon, at step 805, the process receives a request from a subject that identifies to two or more objects. For example, subject X shown in FIG. 5 may send a request that identifies object 1 and object 4. At step 810, the process validates authorization privileges for the subject to run a task.

The process then determines as to whether the subject has access to each object, such as whether subject X has access to both object 1 and object 4 in the example above (subject, object domain validation) (decision 815). If the subject does not have access to each object, then decision 815 branches to the 'no' branch whereupon, at step 820, the process denies the request and FIG. 8 processing thereafter ends at 822.

On the other hand, if the subject has access to each object, then decision 815 branches to the 'yes' branch. The process, at step 825, compares the sets of domains of the corresponding objects to identify the domains that are in common between the sets of domains.

The process then determines the subject's common domain flag attribute value (decision 830). As discussed earlier, in one embodiment, the common domain flag attribute value may be NONE, ANY, or ALL. If the common domain flag attribute value is ANY, then decision 830 branches to the ANY branch whereupon the process determines as to whether the requested objects have at least one domain in common to which the subject belongs (decision 835). For example, FIG. 6 shows that object 2 and object 4 belong to the same domain C 360. If the requested objects have at least one common domain to which the subject belongs, then decision 835 branches to the 'yes' branch. On the other hand, if the objects do not have at least one common domain to which the subject belongs, then decision 835 branches to the 'no' branch whereupon, at step 840, the process denies the request and FIG. 8 processing thereafter ends at 845.

Referring back to decision 830, if the common domain flag attribute value is ALL, then decision 830 branches to the ALL branch. The process determines as to whether all of the objects' domains are in common to which the subject belongs (decision 850). Referring back to FIG. 6, object 2 and 4 do not belong to all of the same domains. If all objects have all domains in common to which the subject belongs, then decision 850 branches to the 'yes' branch. On the other hand, if all objects do not have all domains in common to which the subject belongs, then decision 850 branches to the 'no' branch whereupon, at step 855, the process denies the request and FIG. 8 processing thereafter ends at 860.

Based on the above decisions, when the subject's common domain flag attribute value criteria is met, the process, at step 865, performs the requested operation on the objects. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving, in a role-based access control (RBAC) environment comprising a set of access permissions, a request from a requesting entity to perform an operation between a first object entity and a second object entity, wherein the first object entity belongs to a first set of domains and the second object entity belongs to a second set of domains;
   determining, based on the set of access permissions, that the requesting entity is authorized to access the first object entity and is also authorized to access the second object entity;
   analyzing a common domain flag attribute value corresponding to the requesting entity in response to the determining, wherein the common domain flag attribute value indicates a common domain requirement that the first set of domains and the second set of domains have at least one domain in common;
   detecting that the first set of domains and the second set of domains have at least one domain in common that meet the common domain requirement; and
   performing the operation between the first object entity and the second object entity based on the determination that the first set of domains and the second set of domains have at least one domain in common that meet the common domain requirement, wherein a different common domain requirement is imposed on a different requesting entity.

2. The method of claim 1 further comprising:
   denying the request based on determining that the first set of domains and the second set of domains do not include the at least one domain in common.

3. The method of claim 1 wherein the common domain requirement requires that the first set of domains matches the second set of domains, the method further comprising:
   denying the request based on determining that the first set of domains includes at least one domain that is not included in the second set of domains.

4. The method of claim 1 wherein:
   the first set of domains is different than the second set of domains;
   the first object entity stores a first set of data and the second object entity stores a second set of data; and
   the requesting entity is a process executing on the information handling system.

5. The method of claim 4 wherein the operation comprises sending the first set of data from the first object entity to the second object entity.

6. An information handling system comprising:
   one or more processors;
   a memory coupled to at least one of the processors;
   a set of computer program instructions stored in the memory and executed by at least one of the processors in order to perform actions of:
   receiving, in a role-based access control (RBAC) environment comprising a set of access permissions, a request from a requesting entity to perform an operation between a first object entity and a second object entity, wherein the first object entity belongs to a first set of domains and the second object entity belongs to a second set of domains;
   determining, based on the set of access permissions, that the requesting entity is authorized to access the first object entity and is also authorized to access the second object entity;
   analyzing a common domain flag attribute value corresponding to the requesting entity in response to the determining, wherein the common domain flag attribute value indicates a common domain requirement that the first set of domains and the second set of domains have at least one domain in common;
   detecting that the first set of domains and the second set of domains have at least one domain in common that meet the common domain requirement; and performing the operation between the first object entity and the second object entity based on the determination that the first set of domains and the second set of domains have at least one domain in common that meet the common domain requirement, wherein a different common domain requirement is imposed on a different requesting entity.

7. The information handling system of claim 6 wherein the processors perform additional actions comprising:
    denying the request based on determining that the first set of domains and the second set of domains do not include any domain in common.

8. The information handling system of claim 6 wherein common domain requirement requires that the first set of domains matches the second set of domains, and wherein the processors perform additional actions comprising:
    denying the request based on determining that the first set of domains includes at least one domain that is not included in the second set of domains.

9. The information handling system of claim 6 wherein:
    the first set of domains is different than the second set of domains;
    the first object entity stores a first set of data and the second object entity stores a second set of data; and
    the requesting entity is a process executing on the information handling system.

10. The information handling system of claim 9 wherein the operation comprises sending the first set of data from the first object entity to the second object entity.

11. A computer program product stored in a computer readable storage medium, comprising computer program code that, when executed by an information handling system, causes the information handling system to perform actions comprising:
    receiving, in a role-based access control (RBAC) environment comprising a set of access permissions, a request from a requesting entity to perform an operation between a first object entity and a second object entity, wherein the first object entity belongs to a first set of domains and the second object entity belongs to a second set of domains;
    determining, based on the set of access permissions, that the requesting entity is authorized to access the first object entity and is also authorized to access the second object entity;
    analyzing a common domain flag attribute value corresponding to the requesting entity in response to the determining, wherein the common domain flag attribute value indicates a common domain requirement that the first set of domains and the second set of domains have at least one domain in common;
    detecting that the first set of domains and the second set of domains have at least one domain in common that meet the common domain requirement; and performing the operation between the first object entity and the second object entity based on the determination that the first set of domains and the second set of domains have at least one domain in common that meet the common domain requirement, wherein a different common domain requirement is imposed on a different requesting entity.

12. The computer program product of claim 11 wherein the information handling system performs further actions comprising:
    denying the request based on determining that the first set of domains and the second set of domains do not include any domain in common.

13. The computer program product of claim 11 wherein the common domain requirement requires that the first set of domains matches the second set of domains, and wherein the information handling system performs further actions comprising:
    denying the request based on determining that the first set of domains includes at least one domain that is not included in the second set of domains.

* * * * *